(12) United States Patent
Nista

(10) Patent No.: US 11,717,025 B2
(45) Date of Patent: Aug. 8, 2023

(54) SMOKE FILTER APPARATUS

(71) Applicant: Edward T. Nista, Kingston, WA (US)

(72) Inventor: Edward T. Nista, Kingston, WA (US)

(73) Assignee: Squid Roach, Inc., Dover, DE (US)

( * ) Notice: Subject to any disclaimer, the term of this patent is extended or adjusted under 35 U.S.C. 154(b) by 265 days.

(21) Appl. No.: 17/237,912

(22) Filed: Apr. 22, 2021

(65) Prior Publication Data

US 2022/0338532 A1  Oct. 27, 2022

(51) Int. Cl.

| A24D 3/04 | (2006.01) |
|---|---|
| A24D 3/10 | (2006.01) |
| A24D 3/16 | (2006.01) |
| B01D 39/10 | (2006.01) |
| B01D 39/20 | (2006.01) |
| B01D 39/16 | (2006.01) |
| A24F 1/02 | (2006.01) |
| A24F 7/04 | (2006.01) |

(52) U.S. Cl.
CPC ............... *A24D 3/04* (2013.01); *A24D 3/10* (2013.01); *A24D 3/16* (2013.01); *A24D 3/163* (2013.01); *A24F 1/02* (2013.01); *A24F 7/04* (2013.01); *B01D 39/10* (2013.01); *B01D 39/1615* (2013.01); *B01D 39/2055* (2013.01)

(58) Field of Classification Search
CPC .... A24F 1/02; A24F 1/30; A24F 13/06; A24F 7/00; A24F 7/02; A24F 7/04; A24D 3/00; A24D 3/044; A24D 3/10; A24D 3/16; A24D 3/17; A24D 1/04; A24D 1/045; A24D 1/047; B29C 48/18; B32B 25/20

USPC .......................................................... 131/341

See application file for complete search history.

(56) References Cited

U.S. PATENT DOCUMENTS

| 5,842,526 A | 12/1998 | Archer et al. |
|---|---|---|
| D658,807 S | 5/2012 | Aboushi |
| D695,450 S | 12/2013 | Benassayag et al. |
| D776,868 S | 1/2017 | Rado |
| D787,114 S | 5/2017 | Scott |
| D815,349 S | 4/2018 | Watson |
| D831,272 S | 10/2018 | Qiu |
| D867,657 S | 11/2019 | Fornarelli |
| D874,717 S | 2/2020 | Nhep |
| D912,886 S | 3/2021 | Pan |
| D914,961 S | 3/2021 | Li |
| D920,571 S | 5/2021 | Jones et al. |
| D927,773 S | 8/2021 | Jones et al. |

(Continued)

FOREIGN PATENT DOCUMENTS

DE        2923674 A1 * 12/1980 .............. A24F 1/08

OTHER PUBLICATIONS

DE2923674A1, Espacenet Machine English Translation, Hinterkopf, Kurt G. (Year: 1980).*

(Continued)

*Primary Examiner* — Michael J Felton
*Assistant Examiner* — Ronnie Kirby Jordan
(74) *Attorney, Agent, or Firm* — AEON Law, PLLC; Adam L. K. Philipp; James J. Namiki

(57) ABSTRACT

A smoke filter apparatus comprising a segmented conduit formed of a plurality of nesting sections and comprising one or more filters. The filters may comprise a preferred filter sequence, wherein the preferred filter sequence comprises a metal screen filter, a charcoal filter, and an acetate filter.

14 Claims, 15 Drawing Sheets

(56) References Cited

U.S. PATENT DOCUMENTS

| | | | |
|---|---|---|---|
| D943,184 S | 2/2022 | Jones et al. | |
| D948,784 S | 4/2022 | Liu | |
| D958,449 S | 7/2022 | Yuan | |
| 2006/0182914 A1* | 8/2006 | Yasumatsu et al. ... | B65D 39/00 428/36.8 |
| 2011/0014340 A1 | 1/2011 | Spitzley et al. | |
| 2017/0055579 A1 | 3/2017 | Kuna et al. | |
| 2017/0280925 A1 | 10/2017 | Southern | |
| 2018/0153330 A1 | 6/2018 | Abbiati | |
| 2018/0161823 A1 | 6/2018 | Patton et al. | |

OTHER PUBLICATIONS

International Search Report dated Sep. 2, 2022 for PCT/US22/31636, filed May 31, 2022.
Written Opinion dated Sep. 2, 2022 for PCT/US22/31636), filed May 31, 2022.

* cited by examiner

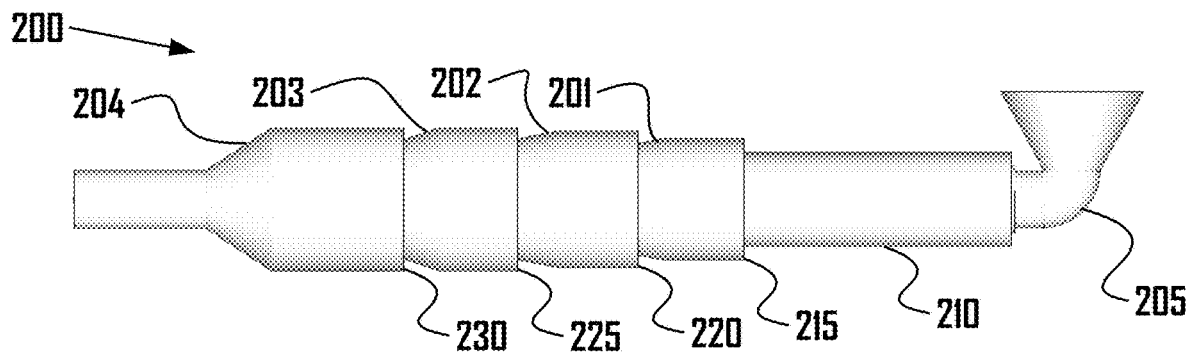
Fig. 2A
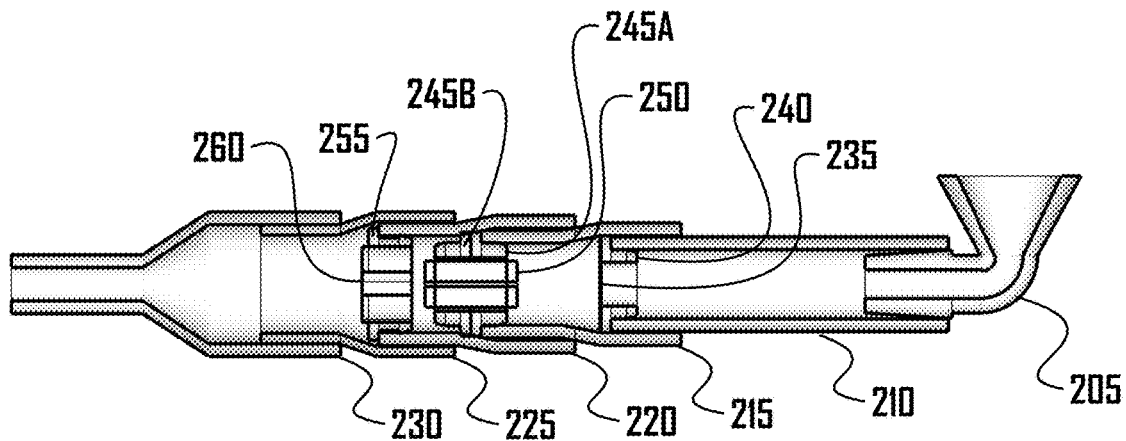
Fig. 2B
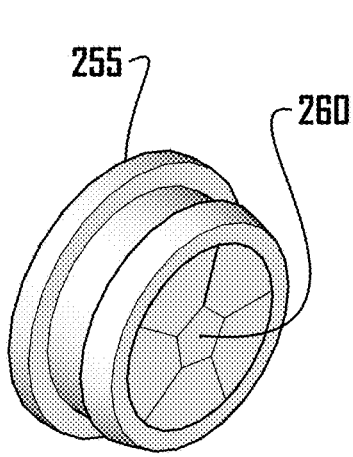 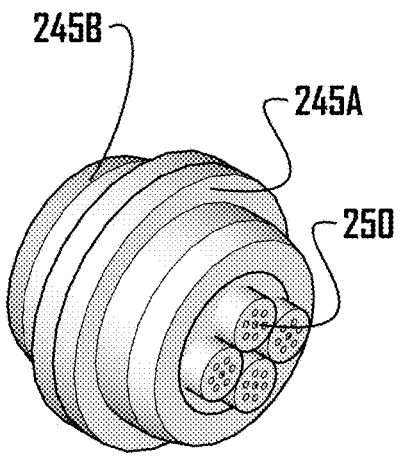 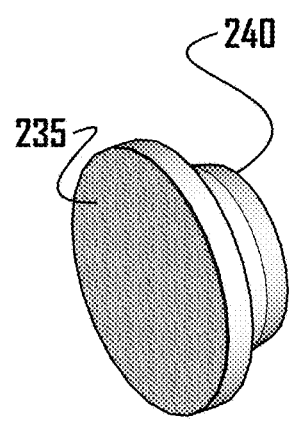
Fig. 2C    Fig. 2D    Fig. 2E

SMOKE FILTER APPARATUS

FIELD

The present disclosure relates to a smoke filter apparatus, in particular, to a smoke filter apparatus comprising one or more nesting sections and filters, wherein the one or more nesting section may connect to a smoking implement and or another nesting section.

BACKGROUND

As used herein, "smoke" is a product of combustion and or vaporization of a "smoked material" (as defined herein); such combustion or vaporization is generally incomplete; smoke generally comprises a particulate phase and a gaseous phase.

As used herein, "smoked material" comprises a material such as tobacco, hemp, marijuana, sage, herbs, or the like, which is combusted or vaporized to release substances which are smelled, tasted, inhaled into lungs, and or absorbed into a bloodstream.

As used herein, a "filter" comprises a filter media which may modify a particulate smoke phase and or a gaseous smoke phase of smoke; the filter media may also obstruct smoked material from being drawn into a smoker's mouth. The filter media may be solid, liquid, or gas.

A solid filter media may comprise a high-surface area material, such as cellulose acetate fiber, wood fiber (e.g. dried wood pulp or paper fiber), crushed charcoal, sand, or the like, through which smoke may be drawn. Solid filter media may comprise charcoal, activated charcoal, flavorants, and substances which change color when exposed to heat (e.g. to turn brown). Solid filter media are generally understood to capture a particulate phase of smoke, though may also modify a gaseous phase of smoke. A liquid filter media may comprise a liquid such as water, alcohol, or the like, into which smoke may be drawn, released as smoke bubbles, wherein the smoke bubbles may rise or otherwise move through and be modified by the liquid filter media. A gas filter media may comprise a gas, wherein smoke may be drawn into and modified by the gas filter media, and wherein the product may then either be further filtered, such as to remove the gas filter media and or a product of its interaction with the smoke, or wherein the gas filter media may be heavier than air and the smoke or the product of interaction between the smoke and the gas filter media may be drawn off of or separated from the gas filter media; gas filter media which are heavier than air at atmospheric pressure and air temperature of 20 degrees Celsius comprise, for example, oxygen, ozone, argon, carbon dioxide, krypton, xenon, or the like.

As used herein, a "smoking implement" is a structure used to combust or vaporize a smoked material and which channels or directs smoke from the smoked material to a human, such as to the human mouth, esophagus, and lungs. Smoking implements comprise pipes, cigarettes, cigars, vaporizers, bongs, hookahs, and the like. Humans use smoking implements to assist in the combustion or vaporization of smoked material, to facilitate inhalation of smoke, and for cultural and aesthetic reasons.

Since at least 5000 BCE, if not earlier, humans have deliberately inhaled smoke from smoked material for a wide range of reasons, including for recreational purposes, spiritual or religious practice, pharmacological reasons, or due to physiological and or psychological addiction to materials in smoke, such as nicotine, *cannabis*, opiates, or the like.

Humans may use a filter to modify a particulate smoke phase or a gaseous smoke phase of smoke. For example, humans may use filters to remove portions of particulate smoke phase or gaseous smoke phase of smoke which are believed to be harmful to human health, which have an objectionable taste, odor, or mouth feel, which have an undesired physiological or psychological effect on the human body, or the like.

However, known filters may be insufficient in terms of volume of smoke which may be passed through them, inefficient in terms of modification of particulate smoke phase or gaseous smoke phase of smoke, awkward to use, may not be reusable, may be expensive, and or may not be useable with more than one smoking implement.

Needed is a smoke filter apparatus through which a consumable volume of smoke may be drawn, which are efficient in terms of modification of particulate smoke phase or gaseous smoke phase of smoke, which are easy to use, inexpensive, portions of which may be reused, and or which may be useable with more than one smoking implement.

BRIEF DESCRIPTION OF THE DRAWINGS

FIG. 2A is a parallel projection elevation view of a segmented smoke filter apparatus, incorporated with teachings of the present disclosure, according to some embodiments.

FIG. 2B is the parallel projection elevation view of the segmented smoke filter apparatus of FIG. 2A with a vertical cross section illustrating examples of filters in friction fittings, incorporated with teachings of the present disclosure, according to some embodiments.

FIG. 2C is a parallel projection oblique view of a filter in a friction fitting of FIG. 2B incorporated with teachings of the present disclosure, according to some embodiments.

FIG. 2D is a parallel projection oblique view of a filter in a friction fitting of FIG. 2B incorporated with teachings of the present disclosure, according to some embodiments.

FIG. 2E is a parallel projection oblique view of a filter in a friction fitting of FIG. 2B incorporated with teachings of the present disclosure, according to some embodiments.

Figure 1A:
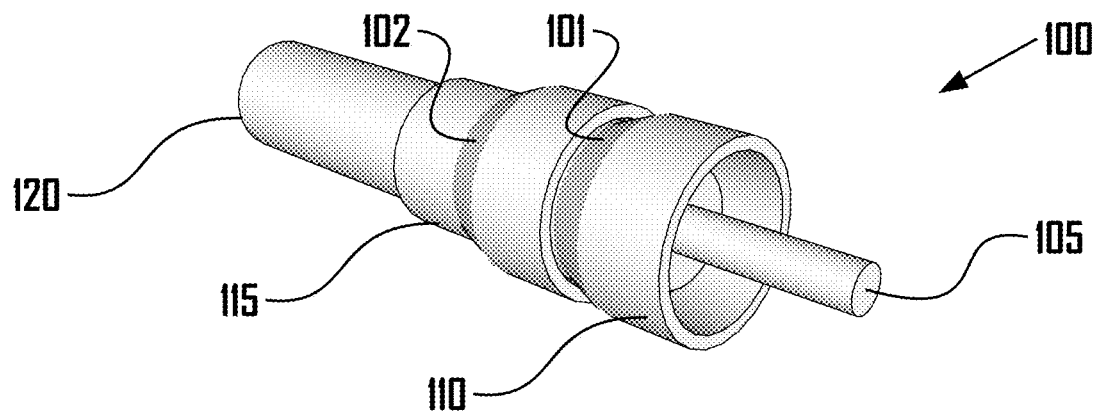
FIG. 1A is a perspective oblique view of a segmented smoke filter apparatus incorporated with teachings of the present disclosure, according to some embodiments.

Although the following Detailed Description will proceed with reference being made to illustrative embodiments, many alternatives, modifications, and variations thereof will be apparent to those skilled in the art.

DETAILED DESCRIPTION

In addition to terms defined in the Background section, following are defined terms in this document.

As used herein, the term "parallel projection" refers to projection of an object in three-dimensional space onto a fixed plane, known as a projection plane or image plane, where rays, known as lines of sight or projection lines, are parallel to each other.

As used herein, the term "perspective projection" refers to projection of an object in three-dimensional space onto a fixed plane, known as a projection plane or image plane, where rays, lines of sight, or projection lines, converge toward a "vanishing point".

As used herein, the term "isomorphic projection" refers to a perspective or parallel projection, in which three coordinate axes of three-dimensional space appear in the image plane to be equally foreshortened and the angle between any two of them is 120 degrees.

Singular references herein to one element in the drawings or to any object or noun shall be understood to refer to one or more, unless the context makes clear otherwise.

As used herein, a "circular sector" or "circle sector", is a portion of a disk enclosed by two radii and an arc, where the smaller enclosed area is known as the minor sector and the larger is known as the major sector. Unless otherwise noted, references herein to "circular sector" refer to a minor sector.

As used herein "releasable", "connect", "connected", "connectable", "disconnect", "disconnected," and "disconnectable" refers to two or more structures which may be connected or disconnected, generally without the use of tools (examples of tools including screwdrivers, pliers, drills, saws, welding machines, torches, irons, and other heat sources) or with the use of tools but in a repeatable manner (such as through the use of nuts and bolts or screws). As used herein, "attach," "attached," or "attachable" refers to two or more structures or components which are attached through the use of tools or chemical or physical bonding, but wherein the structures or components may not generally be released or re-attached in a repeatable manner. As used herein, "secure," "secured," or "securable" refers to two or more structures or components which are connected or attached.

Figure 9:
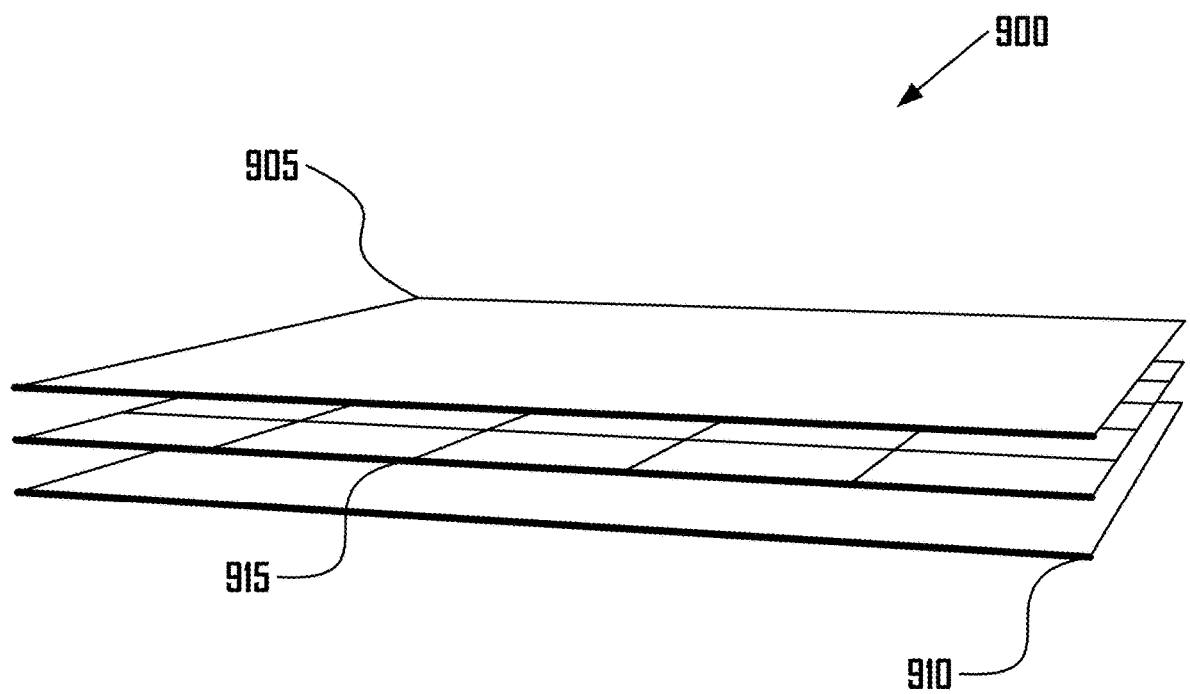
FIG. 9 is a perspective oblique view of a detail of a flexible composite, incorporated with teachings of the present disclosure, according to some embodiments.

In overview, this disclosure relates to a smoke filter apparatus formed from a plurality of nesting stems. The nesting stems may be formed from a flexible composite. The flexible composite may comprise a plurality of layers of a flexible material around a woven fiber core. The flexible material may comprise, for example, silicone, latex, rubber, urethane, or the like. The woven fiber core may comprise fibers, such as cotton, jute, hemp, cellulose, linen, other natural fibers, fiberglass, aramid fibers, carbon fiber, and the like. The flexible composite may be formed by laying or wrapping (hereinafter referred to as "laying", "laid", or the like) a first plurality of strips or layers (hereinafter "layers") of flexible material on a mandril, wherein the mandril has a shape of an interior space of a nesting stem. The woven fiber core may be laid on the first plurality layers and a second plurality of layers of silicone may be laid on the woven fiber core and the first plurality of layers of silicone. The composite structure may be compressed as and after layers are laid, such as to remove air pockets and insure contact between the layers. The plurality of flexible material layers and woven fiber core may be vulcanized, such as through heat treatment or chemical reaction, to form polymer cross-links within and between the plurality of layers of flexible material and across the woven fiber core. After being vulcanized, a flexible composite nesting stem may be removed from a mandril, including with the assistance of a gas or fluid, such as compressed gas or fluid. An example of a flexible composite structure is illustrated in FIG. 9.

The polymer cross-links and the woven fiber core may cause the plurality of nesting stems to resist collapse against a negative relative internal gas pressure within the segmented conduit formed by suction on the smoke filter apparatus.

The vulcanized silicone or other flexible material may resist absorption of liquids, oils, smoke, and the like and the nesting stems may be cleaned, such as by hand, in a dishwasher, and the like. The composite is also flexible, which allows the nesting stems to be secured together and to other components with one or more friction fittings;

examples of other components which may be friction fitted to a nesting section include a combustion or vaporization chamber, filters, and grommets.

Friction fittings which secure nesting stems and other components together may be formed and separated by hand, without the use of tools.

The nesting stems may be formed on a mandril which has a round or circular cross section across a short dimension of the mandril. In embodiments, the short dimension of the mandril may comprise a square, rectangular, triangular, star, or other geometric shape, provided corners of the geometric shape have a bend radius which accommodates an allowable bend radius of the flexible composite. The round or circular cross section of nesting stems illustrated herein are provided by way of example and may serve aesthetic as well as functional purposes.

The nesting stems may be formed on one or more mandrils with in a wide range of shapes, such as the following: i) cross sections along a long dimension of the mandril that are graduated; ii) cross sections along a long dimension of the mandril that comprise a neck, wherein the neck transitions a short dimension of the mandril between a first diameter and a second diameter; iii) cross sections along a long dimension of the mandril which have a constant diameter; iv) cross sections along a long dimension of the mandril that comprise a bulge, such as a bulge within an otherwise constant diameter; and v) cross sections along a long dimension of the mandril that comprise a bend.

Grommets discussed herein may have a shape of a pipe or tube ("pipe"), such as a hollow pipe with an internal diameter, an external diameter, and a thickness. The pipe of a grommet may comprise one or more flanges, projecting outward from the pipe. The flanges may be smooth or barbed. The grommets may be formed of a flexible material, wherein the flexible material of the grommets may be more flexible than the flexible material of the nesting stems. Flexible material of the grommets may comprise, for example, silicone, including non-vulcanized silicone, latex, rubber, urethane, and the like. Flexible material of the grommets may be vulcanized.

The smoke filter apparatus may be configured with one or more filters.

The one or more filters may be held within an internal diameter of a nesting stem or within a negative space between nesting stems. The one or more filters may be held within an internal diameter of a nesting stem or within a negative space between the nesting stems by one or more grommets. Grommets may allow the filters to be inserted into and removed from a segmented smoke filter apparatus. Insertion and or removal of filters may be performed to change a filter, to change a filter characteristic of a segmented smoke filter apparatus with respect to a smoke phase or a gaseous smoke phase of smoke, and to change a rate of airflow through a segmented smoke filter apparatus.

In addition to holding filters, one or more grommets may be used to introduce a compressible bulge within a nesting stem, wherein the compressible bulge may contribute to a friction fitting between a first nesting stem and a second nesting stem.

In addition to holding filters, one or more grommets may be used to increase or decrease airflow through a segmented smoke filter apparatus, such as to restrict airflow to a volume of airflow which a human can provide in one or two inhalations. For example, a rate of gas flow through a segmented smoke filter apparatus and or through a filter within a segmented smoke filter apparatus may be changed by using narrower or wider grommets within the segmented smoke filter apparatus.

One or more filters within a segmented smoke filter apparatus may be arranged in a filter sequence. Starting at an upstream end of a segmented smoke filter apparatus closest to a smoking implement, a preferred filter sequence disclosed herein may comprise a metal screen filter, a charcoal filter, and an acetate filter.

The metal screen filter may modify a particulate phase of smoke from smoked material and may obstruct passage of loose smoked material, ash of smoked material, and may collect oils, tars, and the like.

Performance of the metal screen may change, depending on the presence or absence of downstream grommets or filters. For example, the inventor of the present application has observed that without filters downstream of a first metal screen filter, the first metal screen filter collects less material from smoke drawn through a set of nesting stems. For example, an inventor of the present application has found that with a grommet upstream of a metal screen filter, wherein the upstream grommet provides a smaller central hole or passage through the grommet, that the downstream metal screen filter collects more material compared to when an upstream grommet is used which provides a larger central hole or passage through the grommet. For example, the inventor of the present application has found that material forms on the metal screen filter in the shape of a pellet, with the pellet thicker in the center and taping toward its edges.

Behavior of the metal screen filter in filtering and modifying a smoke phase and or gas phase of smoke, and dependency of this behavior on the presence or absence of other filters and on the size of a passage through the segmented smoke filter apparatus, was not expected. It was not expected that providing a smaller central hole or passage through a grommet proximate to a metal screen filter, which increases a speed of smoke though the smaller central hole or passage, would increase an amount of material caught or formed on the metal screen filter, for a same amount of smoke drawn through the segmented smoke filter apparatus. It was not expected that providing downstream filters, which slow the rate of flow of smoke through the segmented smoke filter apparatus, would increase the amount of material caught or formed on the metal screen filter, for a same amount of smoke drawn through the segmented smoke filter apparatus.

The charcoal filter may comprise activated carbon, with small low-volume pores which increase surface area in the charcoal filter available for adsorption or chemical reactions. The charcoal filter may modify a particulate and or gaseous phase of smoke, including by trapping particles in a size range and by chemical interaction of the charcoal filter with the smoke or absorption of gaseous phase components of the smoke in the charcoal of the charcoal filter. A charcoal filter may release particles, such as charcoal powder or grit, which may cause a mouth feel, including an undesirable mouth feel. The acetate filter may modify a particulate phase of smoke, such as by trapping particles in a size range, including particles in the smoke and particles released by the charcoal filter. The preferred filter sequence may filter smoke such that effects on lung function, breath and odor of breath, are reduced. The metal screen filters within the segmented smoke filter apparatus may be cleaned and reused; the charcoal and acetate filters may be changed; the segmented smoke filter apparatus may be disassembled and cleaned, such as in a dish washing machine.

Examples of metal screens, charcoal filters, acetate filters and assemblies of filters in or with respect to grommets are discussed further herein.

In this way, the segmented smoke filter apparatus may be assembled by hand, may be assembled with a range of nesting stems, may be assembled to comprise one or more filters, including a filter sequence, including the preferred filter sequence disclosed herein or another filter sequence which may be preferred by another person. In this way, the segmented smoke filter apparatus may be assembled and or disassembled by hand, including to change the nesting stems, to change or clean the filters, to change the filter sequence, and to wash the smoke filter apparatus.

FIG. 1A is a perspective oblique view of segmented smoke filter apparatus 100 incorporated with teachings of the present disclosure, according to some embodiments. Illustrated is smoking implement 105. Smoking implement 105 may comprise a vaporizer, a holder for a cigarette, a pipe, a combustion bowl, or the like. Illustrated are nesting stem 110, nesting stem 115, and nesting stem 120, which may be held together by two friction fittings. Nesting stem 110 may comprise neck 101 which transitions nesting stem 110 from a first diameter to a second diameter and nesting stem 115 may comprise neck 102 which transitions nesting stem 115 from a third diameter to a fourth diameter. The outside diameter of the second diameter of nesting stem 110 may fit within and form a friction fitting with the inside diameter of the third diameter of nesting stem 115. Nesting stem 120 may have a constant diameter, wherein the constant diameter of nesting stem fits within and forms a friction fitting with the fourth diameter of nesting stem 115.

Figure 1B:
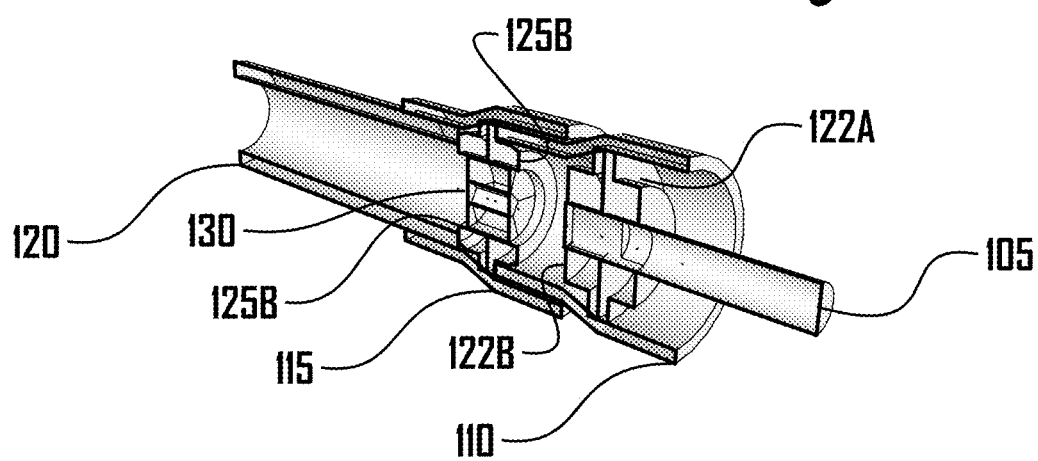
FIG. 1B is the perspective oblique view of the segmented smoke filter apparatus of FIG. 1A with a vertical cross section with a first example of a filter in a friction fitting and a smoking implement in a friction fitting, incorporated with teachings of the present disclosure, according to some embodiments.

FIG. 1B is the perspective oblique view of segmented smoke filter apparatus 100 of FIG. 1A with a vertical cross section with a first example of acetate filter 130 and grommet 122A and grommet 122B securing smoking implement 105 within nesting stem 110, such as at neck 101 of nesting stem 110, incorporated with teachings of the present disclosure, according to some embodiments. Grommet 122A and grommet 122B may be identical, with pipes and flanges, wherein grommet 122A and grommet 122B are rotated 180 degrees relative to one another with flanges touching. Flanges of grommet 122A and grommet 122B may be pushed against neck 101. Flanges of grommet 122A and grommet 122B may form a compressible bulge in nesting stem 110, wherein the compressible bulge assists to form the friction fitting between nesting stem 110 and nesting stem 115.

As illustrated in the example illustrated in FIG. 1B, acetate filter 130 may comprise one or more acetate filters within grommet 125A and grommet 125B. Grommet 125A and grommet 125B may be identical, with pipes and flanges, wherein grommet 125A and grommet 125B are rotated 180 degrees relative to one another with flanges touching. Flanges of grommet 125A and grommet 125B may be pushed against neck 102, within nesting stem 115. Flanges of grommet 125A and grommet 125B may form a compressible bulge in nesting stem 115, wherein the compressible bulge assists to form the friction fitting between nesting stem 110 and nesting stem 115. A downstream end of a pipe of grommet 125A may butt against an upstream end of nesting stem 120. An upstream end of a flange of grommet 125B may butt against a downstream end of nesting stem 110. In this way, grommet 125A and grommet 125B may be held between nesting stem 110 and nesting stem 120.

Acetate filter 130 may melt or combust due to smoke from smoking implement 105 or may become clogged before smoking material in smoking implement 105 is used up, any of which may be undesirable, such as due to taste or due to poor or undesirable modification of the smoke. Therefore, use of an acetate filter immediately downstream of a smoking implement may be undesirable.

Figure 1C:
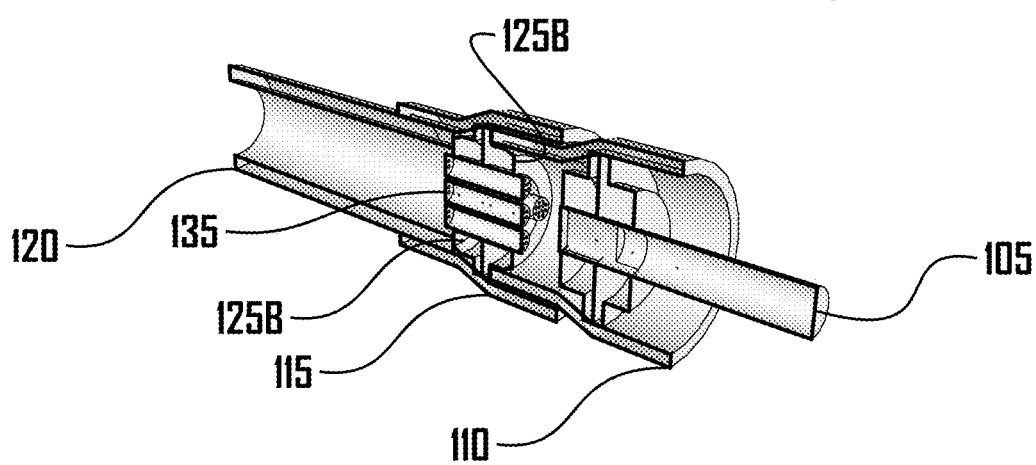
FIG. 1C is the perspective oblique view of the segmented smoke filter apparatus of FIG. 1A with a vertical cross section with a second example of a filter in a friction fitting, incorporated with teachings of the present disclosure, according to some embodiments.

FIG. 1C is the perspective oblique view of segmented smoke filter apparatus 100 of FIG. 1A with a vertical cross section with a second example of charcoal filter 135, incorporated with teachings of the present disclosure, according to some embodiments. Charcoal filter 135 may comprise one or more charcoal filter cartridges within grommet 125A and grommet 125B. Additional space between charcoal filter cartridges within grommet 125A and grommet 125B may be filled by, for example, one or more acetate filters. As in FIG. 1B, flanges of grommet 125A and grommet 125B may be pushed against neck 102, within nesting stem 115 and may form a compressible bulge in nesting stem 115. A downstream end of a pipe of grommet 125A may butt against an upstream end of nesting stem 120. An upstream end of a flange of grommet 125B may butt against a downstream end of nesting stem 110.

Charcoal filter may release particles and or may become clogged before smoking material in smoking implement 105 is used up, any of which may be undesirable, such as due to mouth feel of the released particles or due to poor or undesirable modification of the smoke. Therefore, use of a carbon filter immediately downstream of a smoking implement and or immediately before suction by a human may be undesirable.

FIG. 2A is a parallel projection elevation view of segmented smoke filter apparatus 200, incorporated with teachings of the present disclosure, according to some embodiments.

Illustrated by way of example is smoking implement 205. Smoking implement 205 may comprise a combustion chamber or bowl and a stem, or the like. Illustrated are nesting stem 210, nesting stem 215, nesting stem 220, nesting stem 225, and nesting stem 230, which may be held together by friction fittings. Nesting stem 220 may have a constant diameter. Nesting stem 215 may comprise neck 201 which transitions nesting stem 215 from a first diameter to a second diameter; nesting stem 220 may comprise neck 202 which transitions nesting stem 220 from a third diameter to a fourth diameter; nesting stem 225 may comprise neck 203 which transitions nesting stem 225 from a fifth diameter to a sixth diameter; and nesting stem 230 may comprise neck 204 which transitions nesting stem 230 from a seventh diameter to an eighth diameter.

An outside constant diameter of nesting stem 210 may fit within an inside diameter of the first diameter of nesting stem 215. An outside diameter of second diameter of nesting stem 215 may fit within and form a friction fitting with an inside diameter of the third diameter of nesting stem 220. An outside diameter of fourth diameter of nesting stem 220 may fit within and form a friction fitting with an inside diameter of the fifth diameter of nesting stem 225. An outside diameter of sixth diameter of nesting stem 225 may fit within and form a friction fitting with an inside diameter of the seventh diameter of nesting stem 230. A human may inhale through nesting stem 230.

FIG. 2B is the parallel projection elevation view of segmented smoke filter apparatus 200 of FIG. 2A with a vertical cross section illustrating examples of filters secured by grommets, incorporated with teachings of the present disclosure, according to some embodiments.

FIG. 2B illustrates an example of a friction fitting between smoking implement 205 and nesting stem 210.

FIG. 2B illustrates an example of grommet 240 and metal screen 235. Grommet 240 comprises a pipe and a flange, wherein an upstream edge of the flange of grommet 240 butts against a downstream end of nesting stem 210 and a downstream end of the flange of grommet 240 butts against neck 201 of nesting stem 215. Grommet 240 may cause a compressible bulge within nesting stem 215 which may assist in formation of a friction fitting between nesting stem 215 and nesting stem 220. Metal screen 235 may be downstream of grommet 240 and may be held against neck 201 of nesting section 215.

FIG. 2B illustrates an example of grommet 245A and grommet 245B securing charcoal filter 250 within segmented smoke filter apparatus 200. Grommet 245A and grommet 245B may be identical, with pipes and flanges, wherein grommet 245A and grommet 245B are rotated 180 degrees relative to one another with flanges touching. Flanges of grommet 245A and grommet 245B may be pushed against neck 202. Flanges of grommet 245A and grommet 245B may form a bulge in nesting stem 220. An upstream edge of grommet 245A may butt against a downstream end of nesting stem 215. A downstream edge of grommet 245B may butt against neck 202.

FIG. 2C is a parallel projection oblique view of acetate filter 260 of FIG. 2B incorporated with teachings of the present disclosure, according to some embodiments. Acetate filter 260 comprises a plurality of acetate filters packed within grommet 255, in this example, six acetate filters. A different number of acetate filters may be used. Grommet 255 comprises a pipe, a flange, and a barb. The barb of grommet 255 may facilitate formation of a friction fitting in nesting stem 220. An upstream edge of grommet 255 may butt against a downstream end of nesting stem 220. A downstream end of grommet 255 may butt against neck 203.

FIG. 2D is a parallel projection oblique view of charcoal filter 250 of FIG. 2B incorporated with teachings of the present disclosure, according to some embodiments. Charcoal filter 250 may comprise one or more charcoal filter cartridges secured within grommet 245A and grommet 245B. Additional space between charcoal filter cartridges within grommet 245A and grommet 245B may be filled by, for example, one or more acetate filters.

FIG. 2E is a parallel projection oblique view of metal screen 235 of FIG. 2B incorporated with teachings of the present disclosure, according to some embodiments. Metal screen 235 may rest against grommet 240 and may have sufficient friction with an interior of nesting stem 210 and neck 201 to secure metal screen 235 against grommet 240. An additional grommet may be inserted upstream of grommet 240, such as to restrict flow of smoke.

Figure 3:
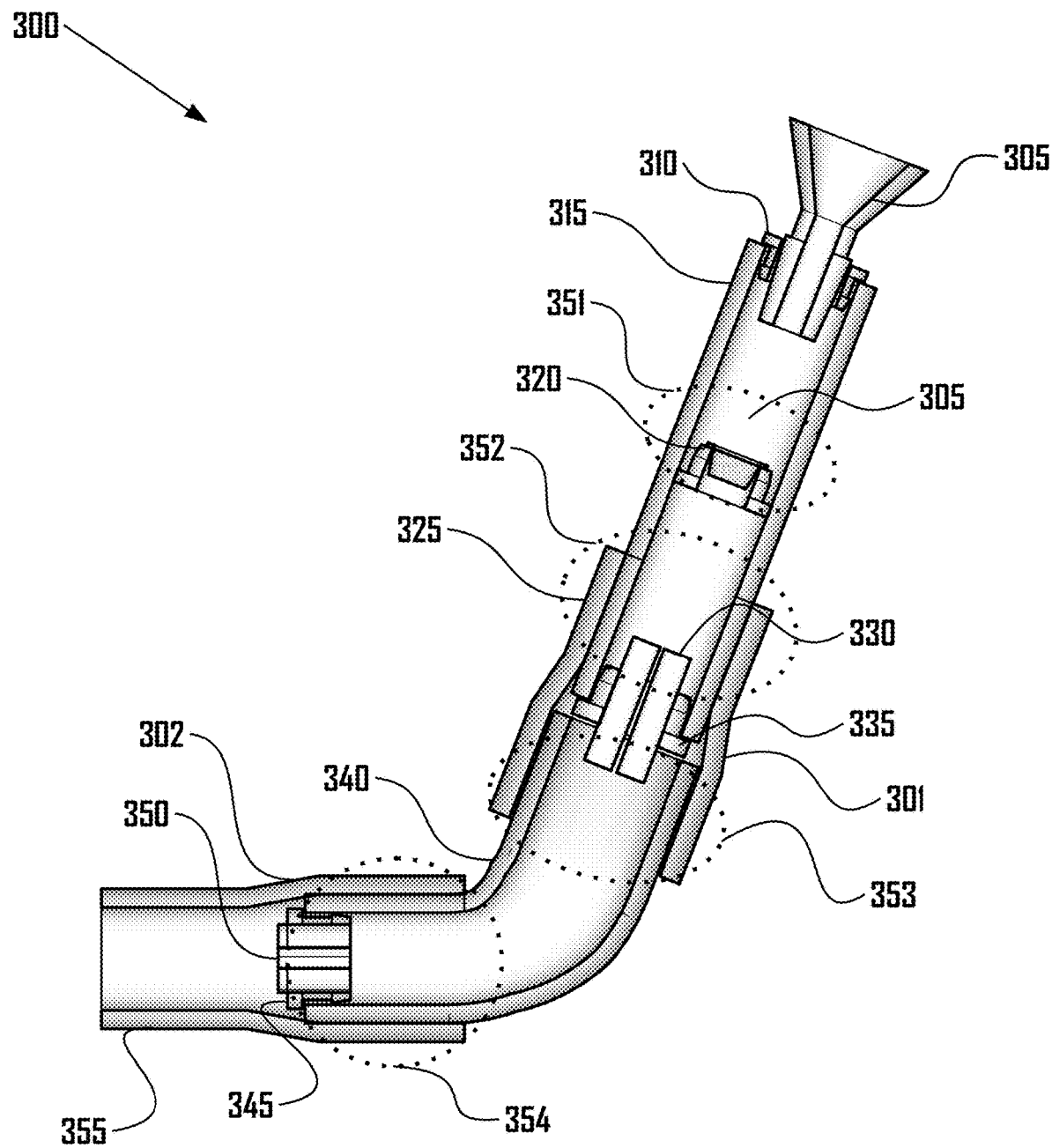
FIG. 3 is a parallel projection elevation view of a segmented smoke filter apparatus with a vertical cross section illustrating examples of filters in friction fittings, incorporated with teachings of the present disclosure, according to some embodiments.

FIG. 3 is a parallel projection elevation view of segmented smoke filter apparatus 300 incorporated with teachings of the present disclosure, according to some embodiments.

Illustrated by way of example is smoking implement 305. Smoking implement 305 may comprise a combustion chamber or bowl and a stem, or the like. Smoking implement 305 may be friction fitted into grommet 310. Grommet 310 may comprise a pipe, a flange, and a barb. The barb of grommet 310 may facilitate formation of a friction fitting inside nesting stem 315.

Illustrated are nesting stem 315, nesting stem 325, nesting stem 340, and nesting stem 355. Nesting stem 315 may have a constant diameter.

Nesting stem 325 may comprise neck 301 which transitions nesting stem 325 from a first diameter to a second diameter. An outside constant diameter of nesting stem 315 may fit within an inside diameter of the first diameter of nesting stem 325 and may form friction fitting 352.

Nesting stem 340 may comprise a neck which transitions nesting stem 340 from a third diameter to a fourth diameter. The neck of nesting stem 340 may comprise a bend. The bend of nesting stem 340 may facilitate a normal orientation of smoking implement 305; e.g., such as during use by a human. An outside diameter of the third diameter of nesting stem 340 may fit within and form friction fitting 353 within an inside diameter of the second diameter of nesting stem 325. An inside diameter of the second diameter of nesting stem 325 may fit around an outside diameter of the third diameter of nesting stem 340.

Nesting stem 355 may comprise a neck which transitions nesting stem 355 from a fifth diameter to a sixth diameter. An outside diameter of the fourth diameter of nesting stem 340 may fit within an inside diameter of the fifth diameter of nesting stem 355, forming friction fitting 354.

Within nesting stem 315 may be metal screen 305, secured within grommet 320. Metal screen 305 may have a shape of a hat or a bowl. Metal screen 305 may fit within a pipe of grommet 320. Grommet 320 may comprise a flange. The flange of grommet 320 may contact an interior of nesting stem 315 with sufficient pressure and or friction to form friction fitting 351.

Within grommet 335 may be charcoal filter 330, as described herein. Grommet 335 may comprise a pipe and a flange. The pipe of grommet 335 may contact and form a friction fitting (not labeled) with an inside diameter of nesting stem 315. An upstream edge of the flange of grommet 335 may butt against a downstream end of nesting stem 315. Grommet 335 may cause a compressible bulge in nesting stem 315 and may facilitate formation of friction fitting 352 between nesting stem 315 and nesting stem 325.

Within nesting stem 340 may be acetate filter 350, as described herein. Acetate filter 350 may comprise a plurality of acetate filters secured within grommet 345. Grommet 345 may comprise a barb. Grommet 345 may cause a compressible bulge in nesting stem 340 and may facilitate formation of friction fitting 354. An upstream edge of a flange of grommet 345 may butt against a downstream end of nesting stem 340. A downstream end of the flange of grommet 345 may butt against neck 302.

A human may inhale through nesting stem 355. One or more grommets, including nesting grommets, may be secured within nesting stem 355, or within another of the nesting stems of segmented smoke filter apparatus 300, such as to restrict airflow.

In this way, segmented smoke filter apparatus 300 may comprise a filter sequence of a metal screen filter, a charcoal filter, and an acetate filter. One or more of the filters in the filter sequence may be changed or cleaned, without necessarily changing all of the filters.

In this way, segmented smoke filter apparatus 300 may comprise a bend.

Figure 4:
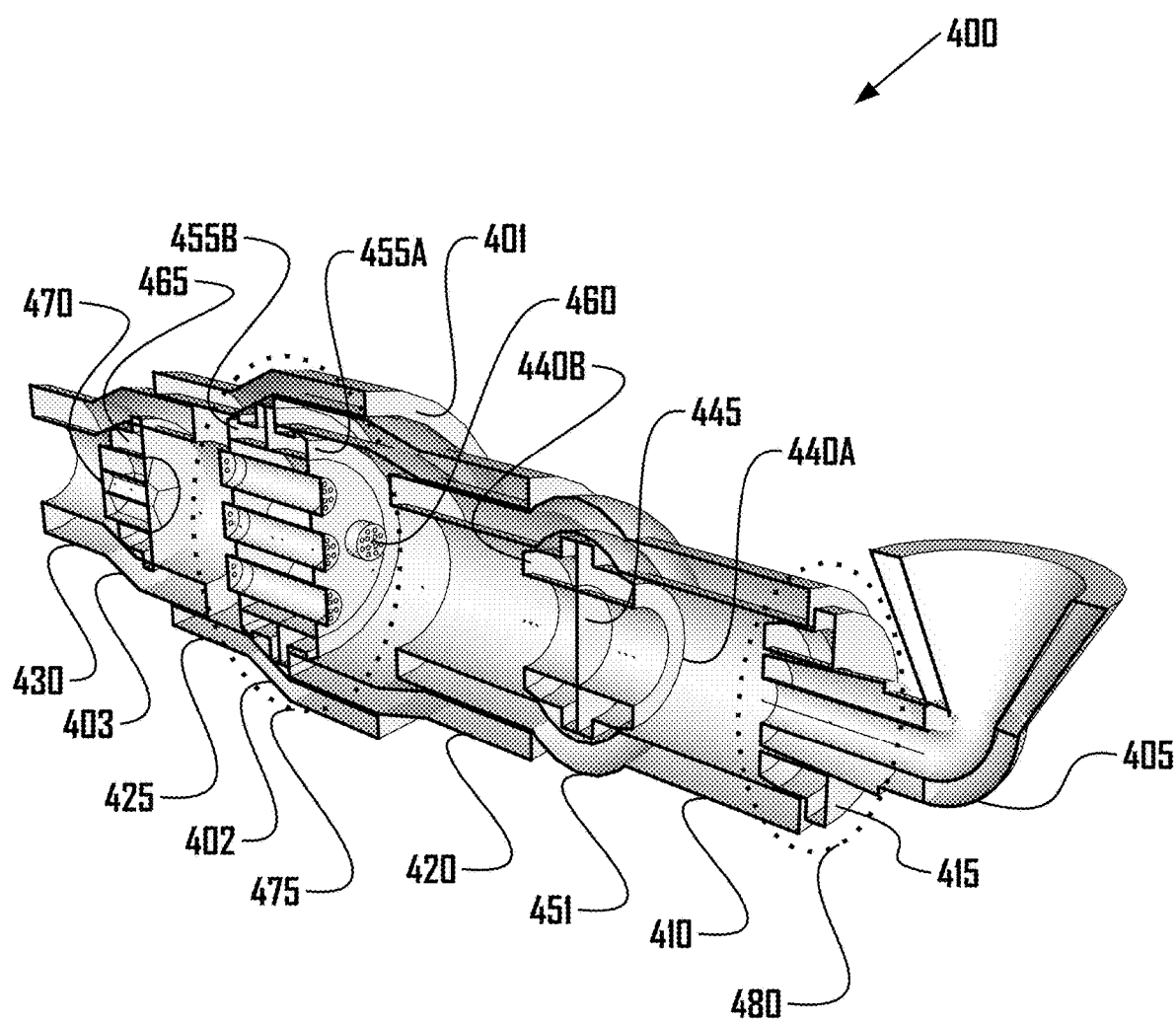
FIG. 4 is a perspective oblique view of a segmented smoke filter apparatus with a vertical cross section illustrating examples of filters in friction fittings, incorporated with teachings of the present disclosure, according to some embodiments.

FIG. 4 is a perspective oblique view of segmented smoke filter apparatus 400 incorporated with teachings of the present disclosure, according to some embodiments.

Illustrated by way of example is smoking implement 405. Smoking implement 405 may comprise a combustion chamber or bowl and a stem, or the like. Smoking implement 405 may be friction fitted into grommet 415. Grommet 415 may comprise a pipe and a flange. A downstream end of the flange of grommet 415 may butt against an upstream end of nesting stem 410. Grommet 415 may form friction fitting 480, with nesting stem 410.

Illustrated are nesting stem 410, nesting stem 420, nesting stem 425, and nesting stem 430. Nesting stem 410 may have a constant diameter and bulge 451. Nesting stem 420 may comprise neck 401 which transitions nesting stem 420 from a first diameter to a second diameter. Nesting stem 425 may comprise neck 402 which transitions nesting stem 425 from a third diameter to a fourth diameter. Nesting stem 430 may comprise neck 403 which transitions nesting stem 430 from a fifth diameter to a sixth diameter.

A downstream outside diameter of the constant diameter of nesting stem 410 may fit within an inside diameter of the first diameter of nesting stem 420 up to bulge 451 and form a friction fitting (not labeled) between nesting stem 410 and nesting stem 420.

A downstream outside diameter of the second diameter of nesting stem 420 may fit within an upstream inside diameter of the third diameter of nesting stem 425 and form friction fitting 475 between nesting stem 420 and nesting stem 425.

A downstream inside diameter of the fourth diameter of nesting stem 425 may fit around an upstream outside diameter of the fifth diameter of nesting stem 430 and form a friction fitting (not labeled) between nesting stem 425 and nesting stem 430.

Within nesting stem 410 may be metal screen 445, secured between grommet 440A and grommet 440B. Grommet 440A and grommet 440B may be identical, with pipes and flanges, wherein grommet 440A and grommet 440B are rotated 180 degrees relative to one another with flanges touching. Flanges of grommet 440A and grommet 440B and metal screen 445 may be pushed within bulge 451.

Within grommet 455A and grommet 455B may be charcoal filter 460, as described herein. Grommet 455A and grommet 455B may be identical, with pipes and flanges, wherein grommet 455A and grommet 455B are rotated 180 degrees relative to one another with flanges touching. An upstream edge of grommet 455A may butt against a downstream end of nesting stem 420. A downstream edge of grommet 455B may butt against neck 402.

Within nesting stem 430 may be acetate filter 470, as described herein. Acetate filter 470 may comprise a plurality of acetate filters secured within grommet 465. Grommet 465 may cause a compressible bulge in nesting stem 430 and may facilitate formation of the friction fitting between nesting stem 430 and nesting stem 425. A downstream edge of grommet 465 may butt against neck 403. A flange of grommet 465 may contact an inside diameter of the seventh diameter of nesting stem 430, form a compressible bulge, and facilitate formation of a friction fitting.

A human may inhale through nesting stem 430. In this way, segmented smoke filter apparatus 400 may comprise a filter sequence of a metal screen filter, a charcoal filter, and an acetate filter. One or more of the filters in the filter sequence may be changed, without necessarily changing all of the filters.

Figure 5:
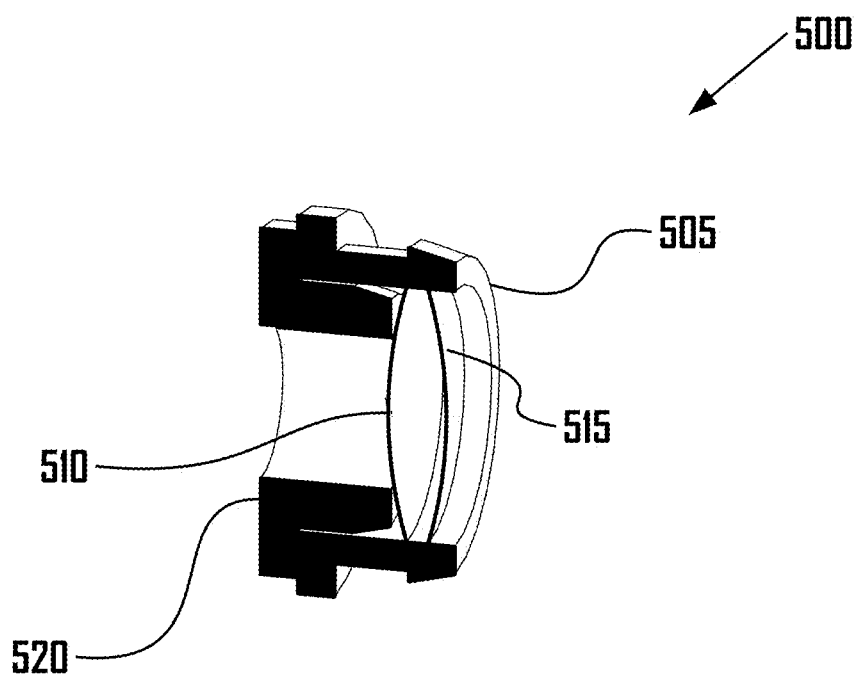
FIG. 5 is parallel projection oblique view of a detail of an example of a filter and or flow limiter in a friction fitting, with a vertical cross section, incorporated with teachings of the present disclosure, according to some embodiments.

FIG. 5 is parallel projection oblique view of a detail of an example of filter 500 in a friction fitting, with a vertical cross section, incorporated with teachings of the present disclosure, according to some embodiments. Filter 500 may be within a segmented smoke filter apparatus. Grommet 505 may comprise a pipe, flange, and barb. Grommet 520 may fit within and form a friction fitting with grommet 505. Metal screen 510 and metal screen 515 may fit within and form a friction fitting with grommet 505. Metal screen 510 and metal screen 515 may pucker or bow and may form a space between them. Metal screen 510 and metal screen 515 may be omitted, in which case filter 500 may act as a flow limiter or flow restrictor, such as to reduce or restrict flow of smoke through a segmented smoke filter apparatus. A direction of flow of smoke may be either from the right or from the left, as viewing FIG. 5.

Figure 6:
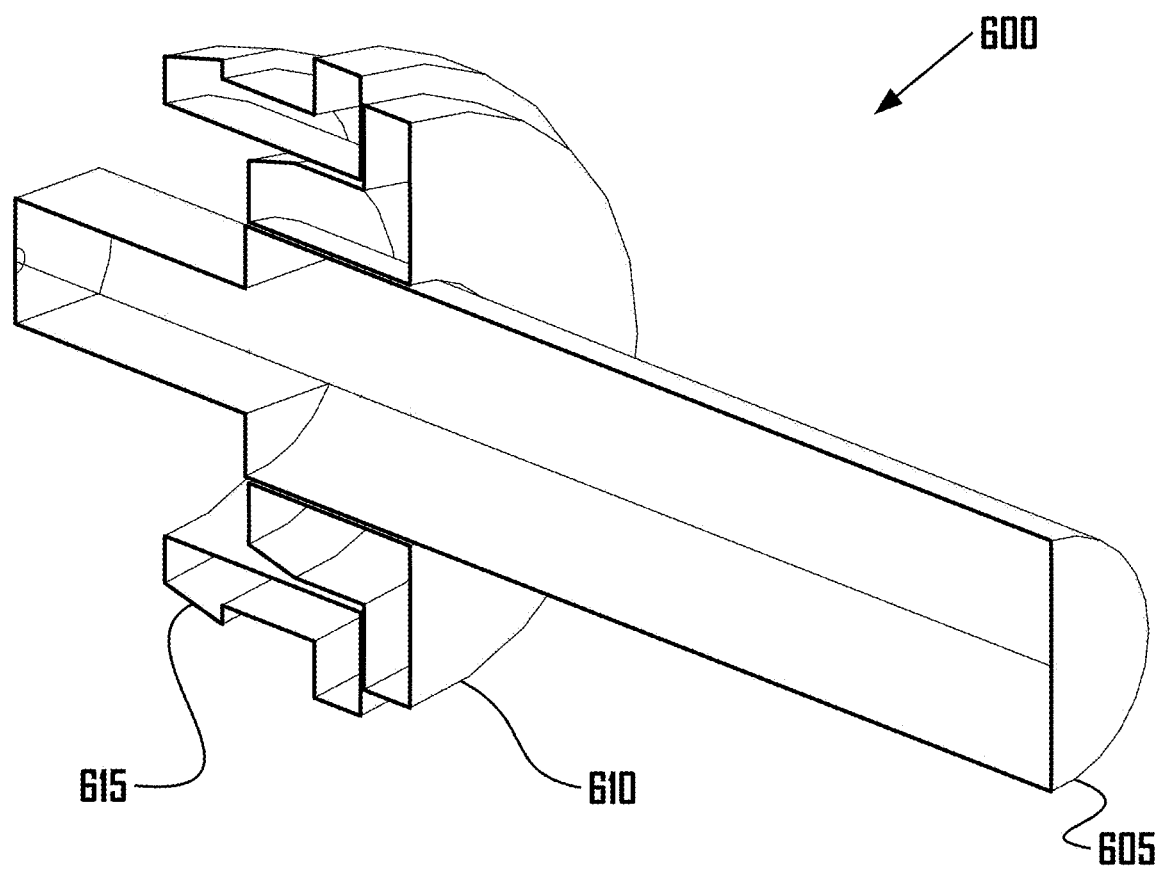
FIG. 6 is parallel projection oblique detail view of an example of a smoking implement in a friction fitting, with a vertical cross section, incorporated with teachings of the present disclosure, according to some embodiments.

FIG. 6 is parallel projection oblique detail view of an example of smoking implement 605 in friction fitting 600, with a vertical cross section, incorporated with teachings of the present disclosure, according to some embodiments. Friction fitting 600 may comprise, for example, grommet 610 and grommet 615. Smoking implement 605 may comprise, for example, a vaporizer, a cigarette, a holder for a cigarette, a pipe stem, a stem of a combustion bowl, or the like. Friction fitting 600 may fit within a nesting stem of a segmented smoke filter apparatus, holding smoking implement 605 and potentially forming a compressible bulge in a nesting stem of the segmented smoke filter apparatus.

Figure 7:
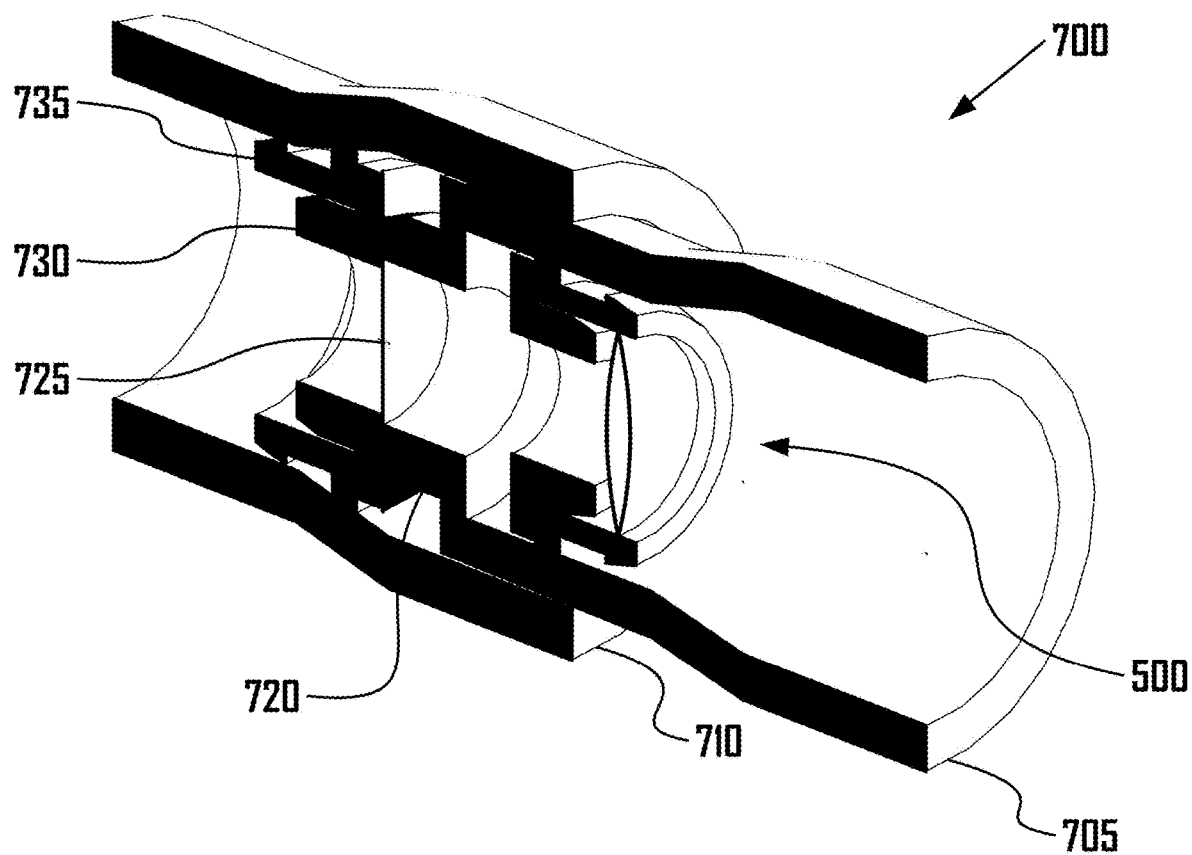
FIG. 7 is parallel projection oblique view of a detail of a segmented smoke filter apparatus with a vertical cross section illustrating examples of filters in friction fittings, incorporated with teachings of the present disclosure, according to some embodiments.

FIG. 7 is parallel projection oblique view of detail 700 of a segmented smoke filter apparatus with a vertical cross section illustrating examples of filters in friction fittings, incorporated with teachings of the present disclosure, according to some embodiments. Filter 500, described in relation to FIG. 5, may be within nesting stem 705 and may form a compressible bulge. The compressible bulge may facilitate formation of a friction fitting between nesting stem 705 and nesting stem 710. Within nesting stem 710 and butting against an end of nesting stem 705 is grommet 720. Butting against an end of grommet 720 is metal screen 725. Metal screen 725 may be larger than as illustrated and may contact an interior of nesting stem 710. Butting against metal screen 725 is grommet 730. Grommet 730 may comprise a pipe and a flange. Grommet 730 may be within and form a friction fitting with grommet 735. Grommet 735 and grommet 730 may be within and form a friction fitting with nesting stem 710. Flow of smoke within detail 700 may be from the left to the right, viewing FIG. 7.

Figure 8:
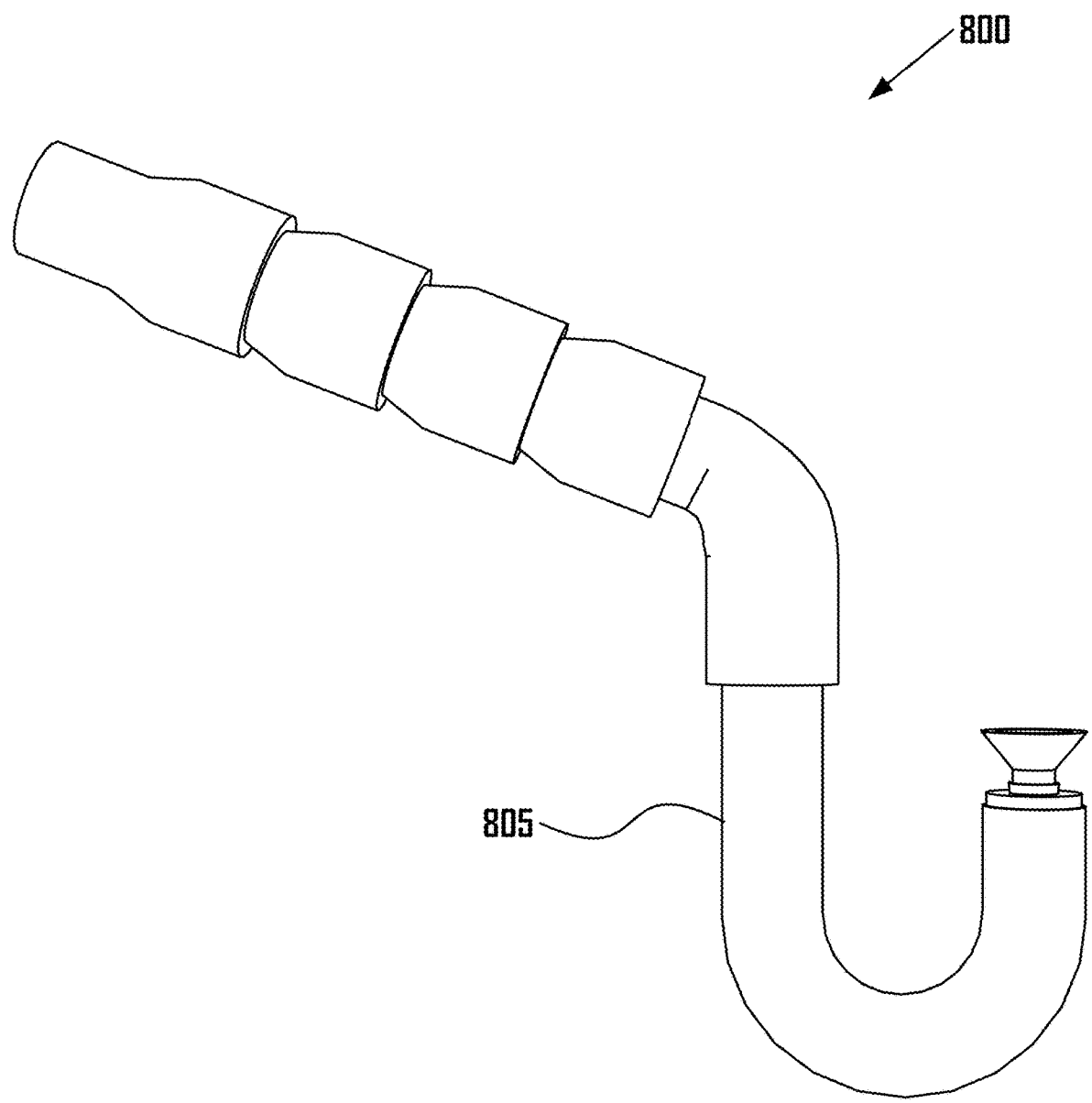
FIG. 8 is a perspective oblique view of a segmented smoke filter apparatus incorporated with teachings of the present disclosure, according to some embodiments.

FIG. 8 is a perspective oblique view of segmented smoke filter apparatus 800 incorporated with teachings of the present disclosure, according to some embodiments. Segmented smoke filter apparatus 800 may comprise a bend in nesting stem 805, within which water or another liquid filter media or gas filter media may be located.

FIG. 9 is a perspective oblique view of a detail of a flexible composite, incorporated with teachings of the present disclosure, according to some embodiments. In FIG. 9 flexible material 905 and flexible material 910, such as silicone, are laid up on woven fiber core 915. Additional layers of flexible material and or additional layers of woven fiber core may be used. The weaving and orientation of woven fiber core may be other than as illustrated in FIG. 9. Please refer to the discussion, herein, of the flexible composite.

Figure 10:
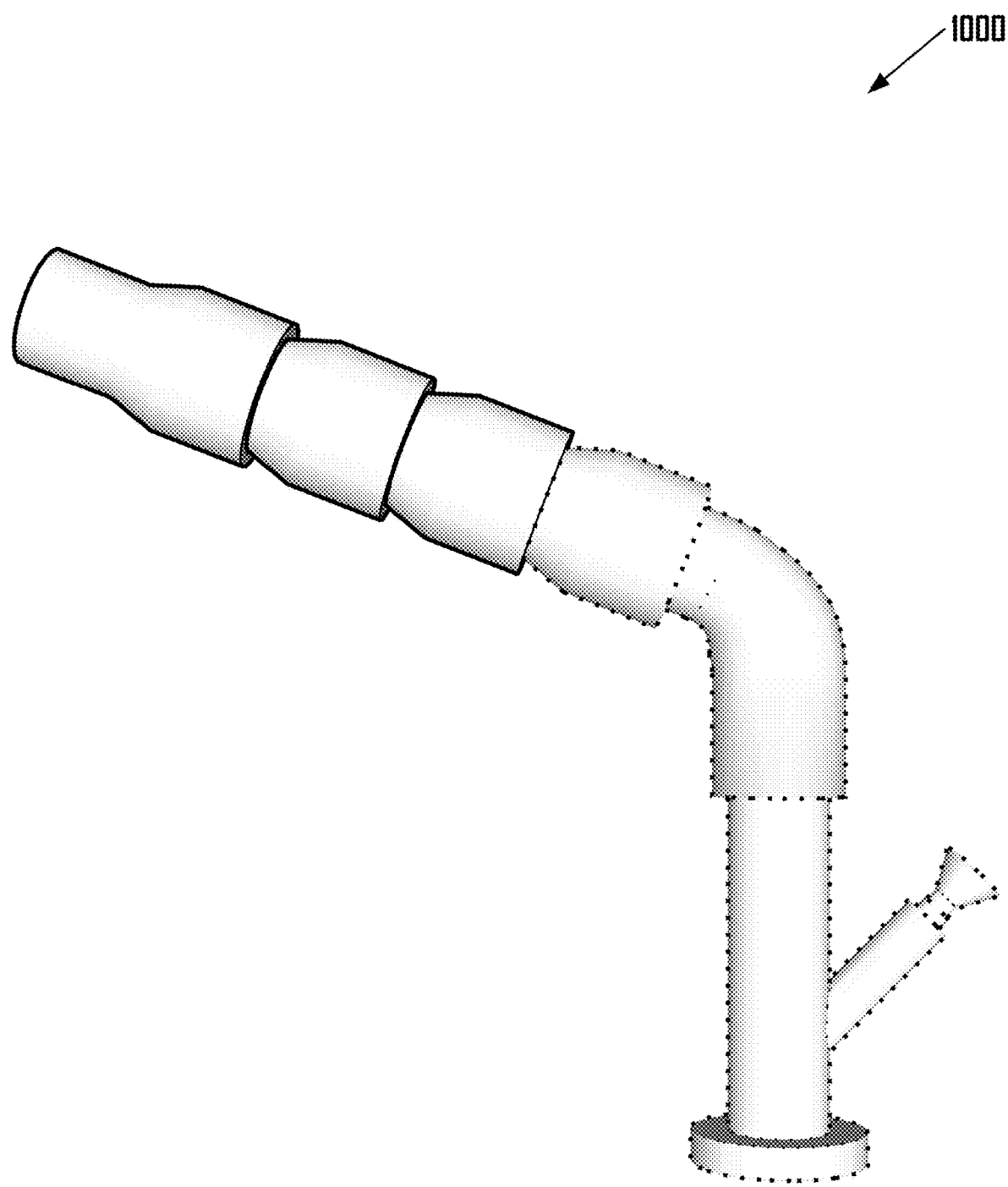
FIG. 10 is a perspective right side elevation view of a segmented smoke filter apparatus incorporated with teachings of the present disclosure, with portions in broken line to support a potential design patent application, according to some embodiments.

FIG. 10 is a perspective right side elevation view 1000 of a segmented smoke filter apparatus incorporated with teachings of the present disclosure, with portions in broken line to support a potential design patent application, according to some embodiments. A design patent application may claim the benefit of a non-provisional patent application. As discussed herein, nesting stems may have cross section which is not round, e.g. which are square, and which still perform the same function. In addition, the nesting stems may be arranged in other patterns. The form and arrangement of nesting stems of the segmented smoke filter apparatus of perspective right side elevation view 1000 serves an aesthetic function. A design patent application may comprise portions in broken line, which portions do not form part of claimed design patent protection; for this reason, portions of perspective right side elevation view 1000 are in broken line.

Figure 11:
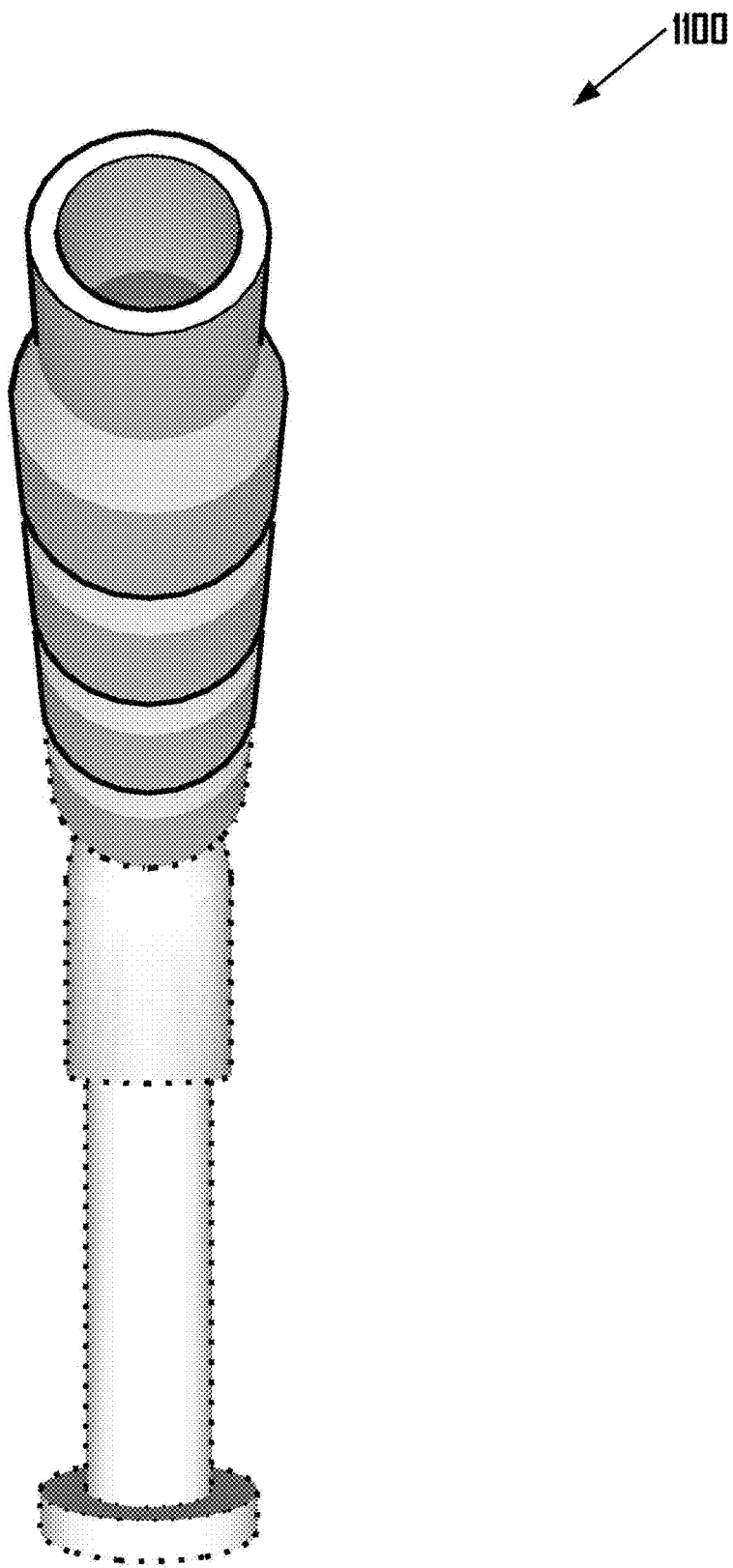
FIG. 11 is a perspective back side elevation view of a segmented smoke filter apparatus incorporated with teachings of the present disclosure, with portions in broken line to support a potential design patent application, according to some embodiments.

FIG. 11 is a perspective back side elevation view 1100 of the segmented smoke filter apparatus incorporated with teachings of the present disclosure, with portions in broken line to support a potential design patent application of FIG. 10, according to some embodiments.

Figure 12:
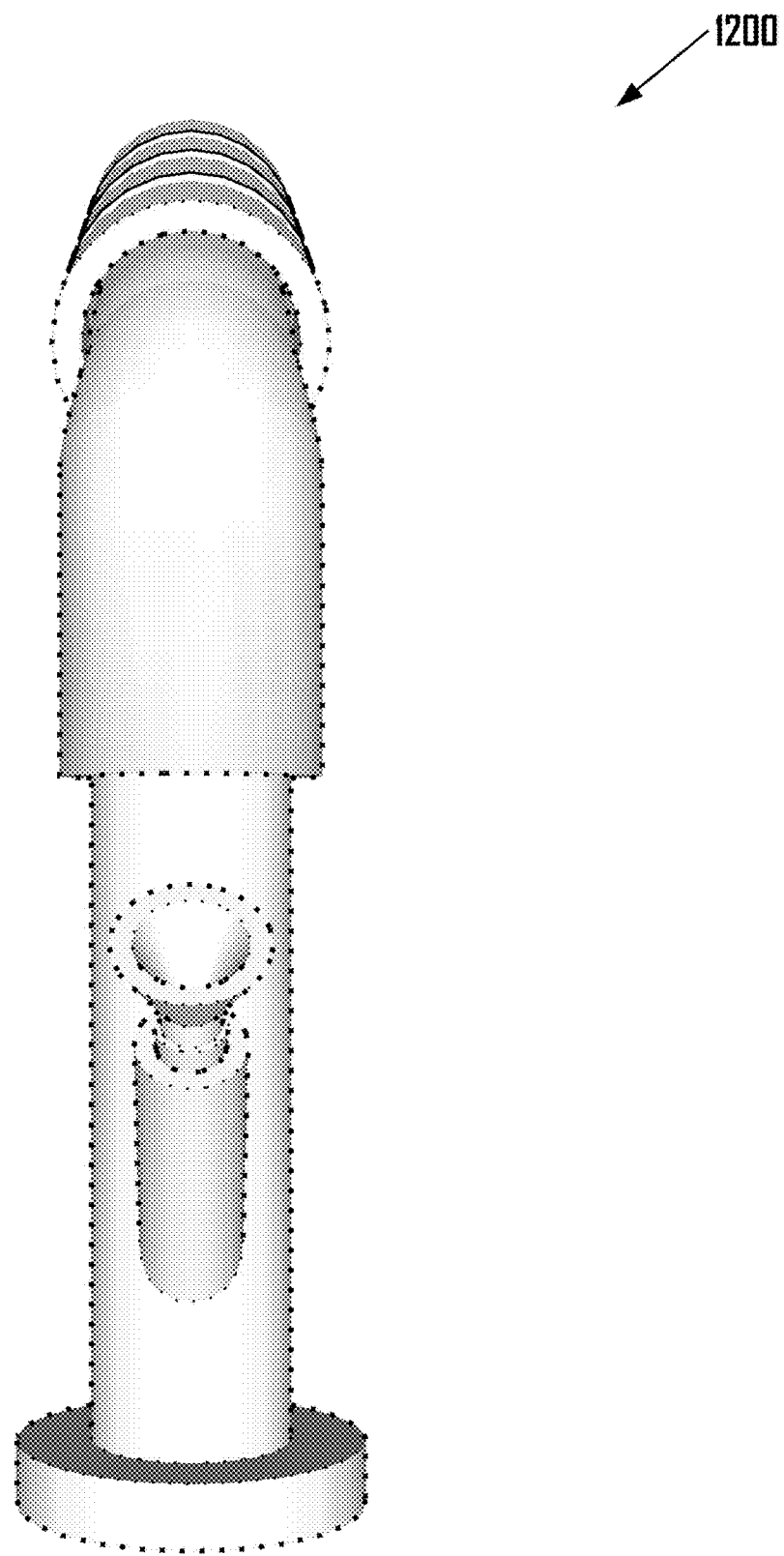
FIG. 12 is a perspective front side elevation view of a segmented smoke filter apparatus incorporated with teachings of the present disclosure, with portions in broken line to support a potential design patent application, according to some embodiments.

FIG. 12 is a perspective front side elevation view 1200 of the segmented smoke filter apparatus incorporated with teachings of the present disclosure, with portions in broken line to support a potential design patent application of FIG. 10, according to some embodiments.

Figure 13:
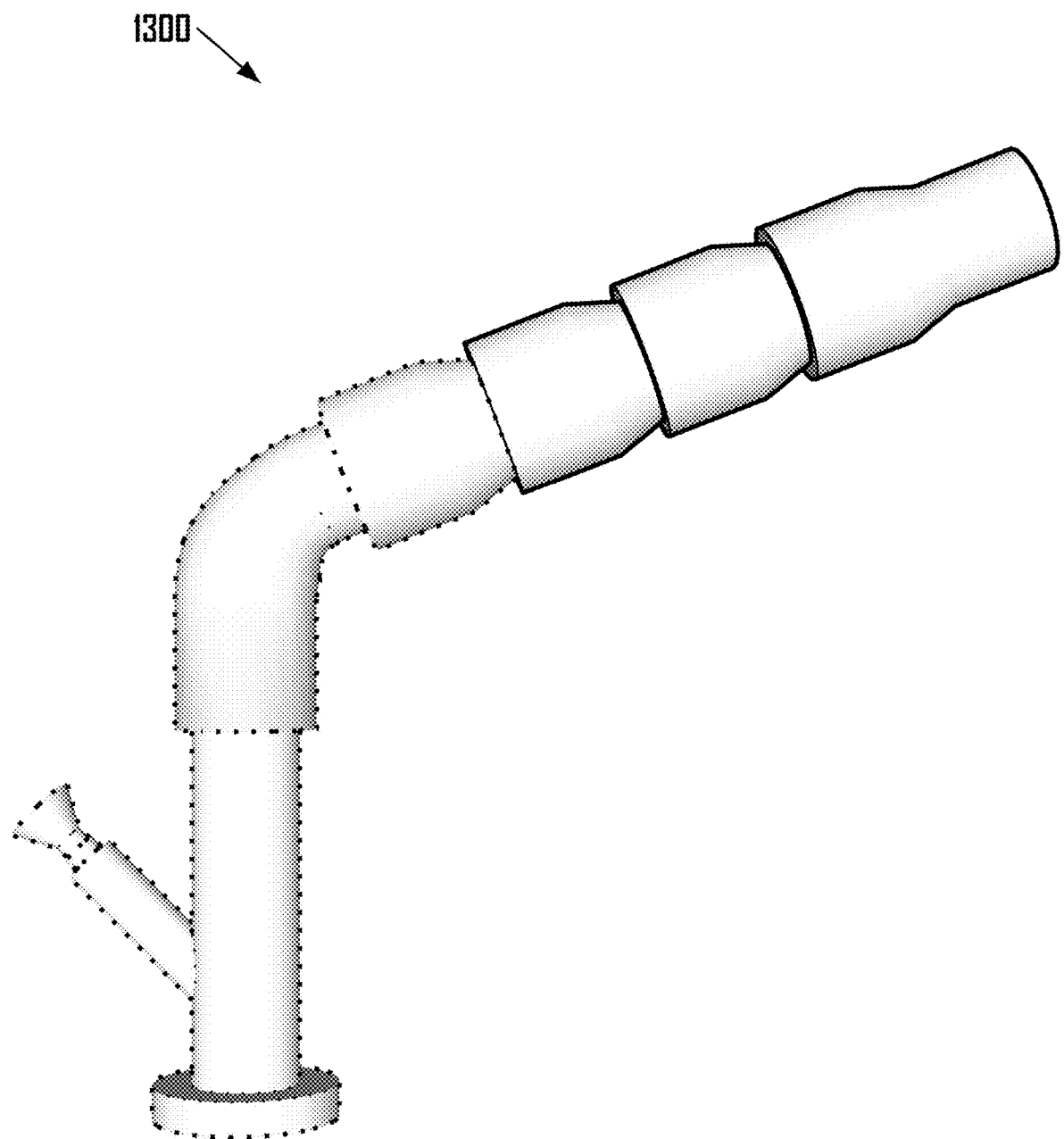
FIG. 13 is a perspective left side elevation view of a segmented smoke filter apparatus incorporated with teachings of the present disclosure, with portions in broken line to support a potential design patent application, according to some embodiments.

FIG. 13 is a perspective left side elevation view 1300 of the segmented smoke filter apparatus incorporated with teachings of the present disclosure, with portions in broken line to support a potential design patent application of FIG. 10, according to some embodiments.

Figure 14:
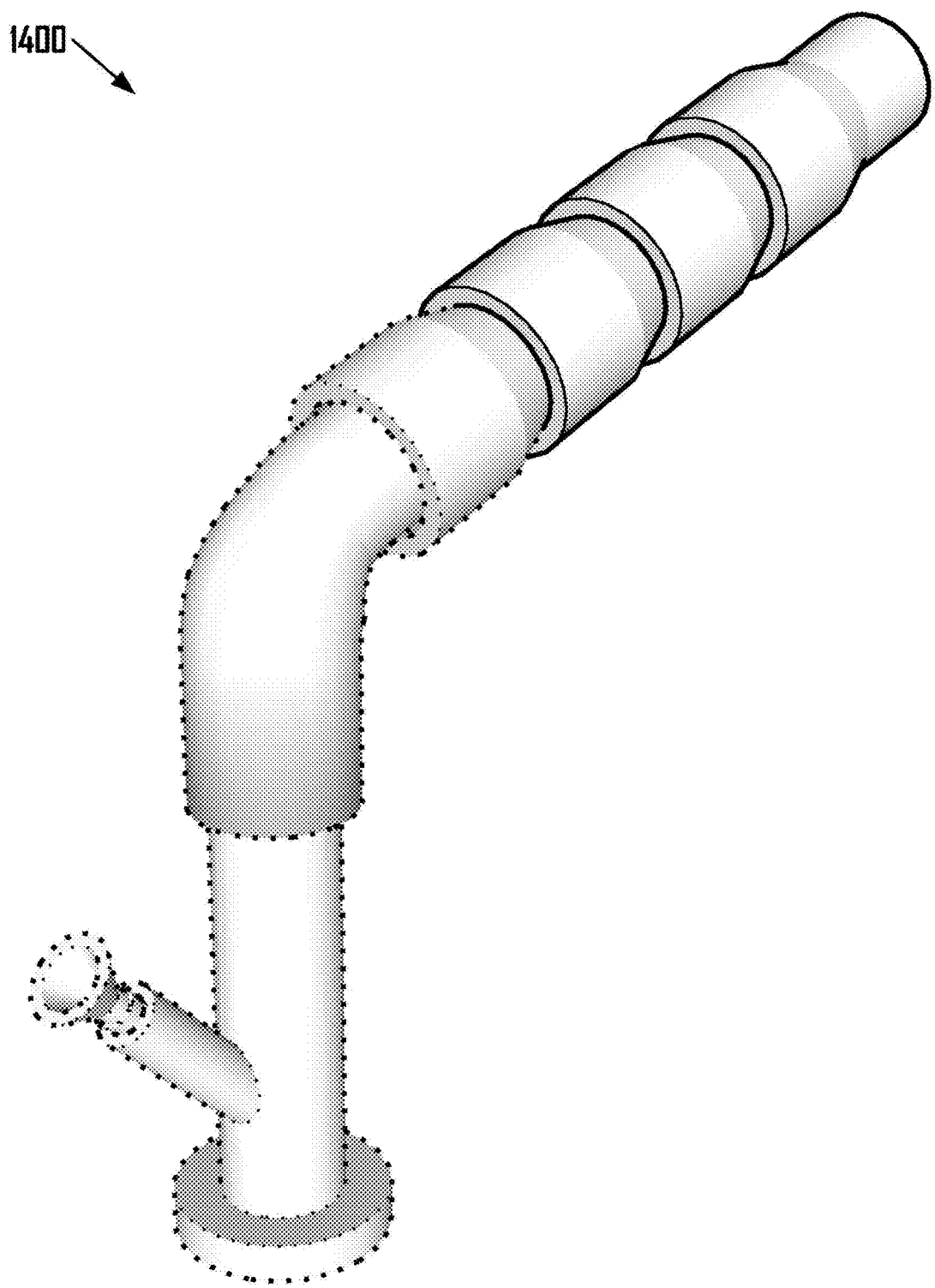
FIG. 14 is a perspective isomorphic view of a segmented smoke filter apparatus incorporated with teachings of the present disclosure, with portions in broken line to support a potential design patent application, according to some embodiments.

FIG. 14 is a perspective isomorphic view 1400 of the segmented smoke filter apparatus incorporated with teachings of the present disclosure, with portions in broken line to support a potential design patent application of FIG. 10, according to some embodiments.

Figure 15:
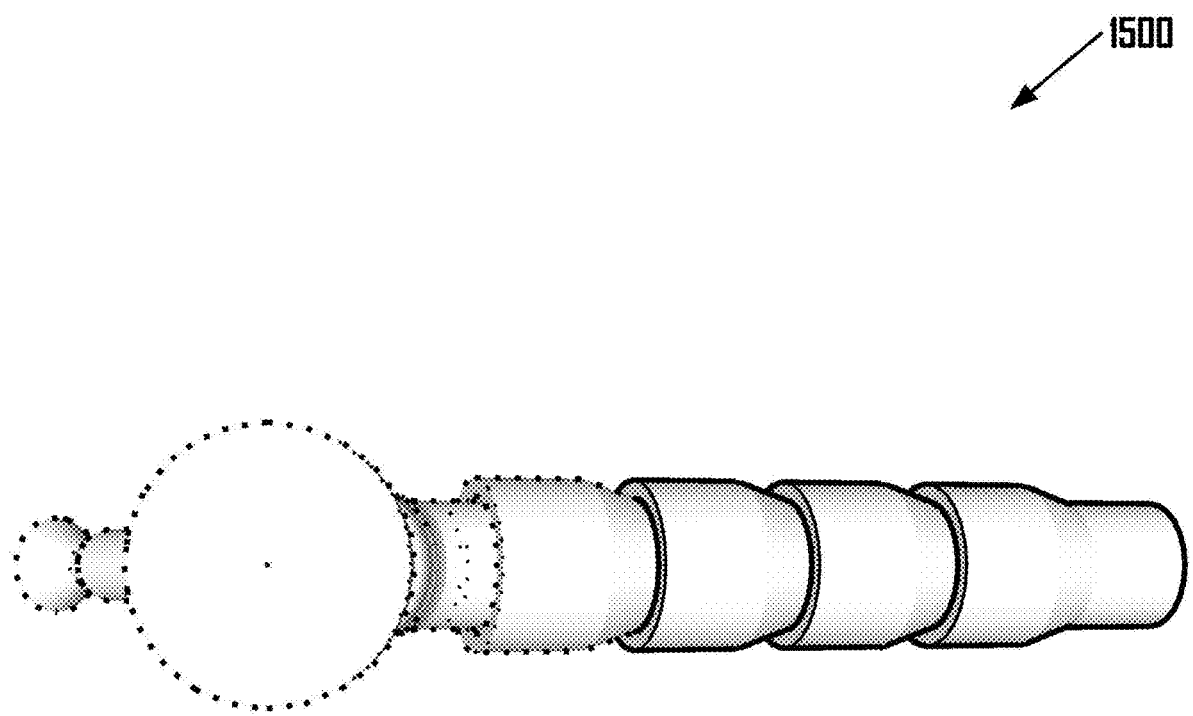
FIG. 15 is a perspective bottom view of a segmented smoke filter apparatus incorporated with teachings of the present disclosure, with portions in broken line to support a potential design patent application, according to some embodiments.

FIG. 15 is a perspective bottom view 1500 of the segmented smoke filter apparatus incorporated with teachings of the present disclosure, with portions in broken line to support a potential design patent application of FIG. 10, according to some embodiments.

Following are additional examples of segmented smoke filter apparatus discussed herein.

Example 1. A smoke filter apparatus to modify a particulate or gas phase of a smoke from a smoked material, wherein the smoke filter apparatus comprises a plurality of nesting stems, wherein the plurality of nesting stems form a segmented conduit through which the smoke from the smoked material passes, one or more filters within the segmented conduit and between the plurality of nesting stems, wherein the one or more filters are held by one or more grommets.

Example 2. The smoke filter apparatus according to Example 1, wherein the plurality of nesting stems comprises a first nesting stem, a second nesting stem, a third nesting stem, and a fourth nesting stem, wherein the first nesting stem comprises a first upstream end and a first downstream end, wherein the second nesting stem comprises a second upstream end and a second downstream end, wherein the third nesting stem comprises a third upstream end and a third downstream end, and wherein the fourth nesting stem comprises a fourth upstream end and a fourth downstream end, wherein the first downstream end of the first nesting stem is held by a first friction fitting within the second upstream end of the second nesting stem, wherein the second downstream end of the second nesting stem is held by a second friction fitting within the third upstream end of the third nesting stem, and wherein the third downstream end of the third nesting stem is held by a third friction fitting within the fourth upstream end of the fourth nesting stem.

Example 3. The smoke filter apparatus according to Example 2, wherein a first filter in the one or more filters comprises one or more metal screen filters, wherein a second filter in the one or more filters comprises one or more charcoal filter cartridges, and wherein a third filter in the one or more filters comprises one or more acetate filters.

Example 4. The smoke filter apparatus according to Example 1 or Example 2, wherein a first filter in the one or more filters comprises one or more metal screens.

Example 5. The smoke filter apparatus according to Example 4, wherein the first filter is held within the segmented conduit by a first grommet, wherein a flange of the first grommet fits against the first downstream end of the first nesting stem.

Example 6. The smoke filter apparatus according to Example 4 or Example 2, wherein a second filter in the one or more filters comprises one or more charcoal filter cartridges.

Example 7. The smoke filter apparatus according to Example 6, wherein the one or more charcoal filter cartridges of the second filter are held within a second grommet and a third grommet, wherein flanges of the second grommet and the third grommet fit against the second downstream end of the second nesting stem.

Example 8. The smoke filter apparatus according to Example 6 or Example 2, wherein a third filter in the one or more filters comprises one or more acetate filters.

Example 9. The smoke filter apparatus according to Example 8, wherein the one or more acetate filters of the third filter are held within a fourth grommet, wherein a flange of the fourth grommet fits against the third downstream end of the third nesting stem.

Example 10. The smoke filter apparatus according to one or more of Example 1 to Example 9, wherein the one or more grommets comprise barbless grommets and barbed grommets.

Example 11. The smoke filter apparatus according to one or more of Example 1 to Example 9, wherein the one or more grommets form one or more compressible bulges within at least a subset of the plurality of nesting stems.

Example 12. The smoke filter apparatus according to Example 11, wherein the one or more compressible bulges facilitate formation of friction fittings, wherein the friction fittings secure the plurality of nesting stems together.

Example 13. The smoke filter apparatus according to Example 1, wherein a first of the plurality of nesting stems comprises a receiver for a combustion or vaporization chamber in which the smoked material may be combusted or vaporized.

Example 14. The smoke filter apparatus according to Example 1, wherein the plurality of nesting stems are formed of a flexible composite.

Example 15. The smoke filter apparatus according to Example 12, wherein the flexible composite comprises a plurality of silicone layers around a woven fiber core, and wherein the plurality of silicone layers are vulcanized to form polymer cross-links between the plurality of silicone layers, wherein the polymer cross-links and the woven fiber core cause the plurality of nesting stems to resist collapse against a negative relative internal gas pressure within the segmented conduit formed by suction on the smoke filter apparatus.

Example 16. The smoke filter apparatus according to Example 1, wherein the segmented conduit increases to a cross-sectional area greater than 2.5" and wherein a nesting stem or a grommet downstream of the cross-sectional area greater than 2.5 comprises a downstream diameter which is less than 2.5", thereby allowing a human to draw a consumable quantity of smoke through the smoke filter apparatus in a human inhalation.

The invention claimed is:

1. A smoke filter apparatus to modify a particulate or gas phase of a smoke from a smoked material, wherein the smoke filter apparatus comprises:
   a plurality of nesting stems, wherein the plurality of nesting stems form a segmented conduit through which the smoke from the smoked material passes; and one or more filters within the segmented conduit, wherein the one or more filters are held by one or more grommets;

wherein the plurality of nesting stems comprises a first nesting stem, a second nesting stem, a third nesting stem, and a fourth nesting stem, wherein the first nesting stem comprises a first upstream end and a first downstream end, wherein the second nesting stem comprises a second upstream end and a second downstream end, wherein the third nesting stem comprises a third upstream end and a third downstream end, and wherein the fourth nesting stem comprises a fourth upstream end and a fourth downstream end, wherein the first downstream end of the first nesting stem is held by a first friction fitting within the second upstream end of the second nesting stem, wherein the second downstream end of the second nesting stem is held by a second friction fitting within the third upstream end of the third nesting stem, and wherein the third downstream end of the third nesting stem is held by a third friction fitting within the fourth upstream end of the fourth nesting stem.

2. The smoke filter apparatus according to claim 1, wherein a first filter in the one or more filters comprises one or more metal screen filters, wherein a second filter in the one or more filters comprises one or more charcoal filter cartridges, and wherein a third filter in the one or more filters comprises one or more acetate filters.

3. The smoke filter apparatus according to claim 1, wherein a first filter in the one or more filters comprises one or more metal screens.

4. The smoke filter apparatus according to claim 3, wherein the first filter is held within the segmented conduit by a first grommet, wherein a flange of the first grommet fits against the first downstream end of the first nesting stem.

5. The smoke filter apparatus according to claim 1, wherein a second filter in the one or more filters comprises one or more charcoal filter cartridges.

6. The smoke filter apparatus according to claim 5, wherein the one or more charcoal filter cartridges of the second filter are held within a second grommet and a third grommet, wherein flanges of the second grommet and the third grommet fit against the second downstream end of the second nesting stem.

7. The smoke filter apparatus according to claim 1, wherein a third filter in the one or more filters comprises one or more acetate filters.

8. The smoke filter apparatus according to claim 7, wherein the one or more acetate filters of the third filter are held within a fourth grommet, wherein a flange of the fourth grommet fits against the third downstream end of the third nesting stem.

9. The smoke filter apparatus according to claim 1, wherein the one or more grommets comprise barbless grommets and barbed grommets.

10. The smoke filter apparatus according to claim 1, wherein the one or more grommets form one or more compressible bulges within at least a subset of the plurality of nesting stems.

11. The smoke filter apparatus according to claim 10, wherein the one or more compressible bulges facilitate formation of friction fittings, wherein the friction fittings secure the plurality of nesting stems together.

12. The smoke filter apparatus according to claim 1, wherein a first of the plurality of nesting stems comprises a receiver for a combustion or vaporization chamber in which the smoked material may be combusted or vaporized.

13. The smoke filter apparatus according to claim 1, wherein the plurality of nesting stems are formed of a flexible composite.

14. The smoke filter apparatus according to claim 13, wherein the flexible composite comprises a plurality of silicone layers around a woven fiber core, and wherein the plurality of silicone layers are vulcanized to form polymer cross-links between the plurality of silicone layers, wherein the polymer cross-links and the woven fiber core cause the plurality of nesting stems to resist collapse against a negative relative internal gas pressure within the segmented conduit formed by suction on the smoke filter apparatus.

* * * * *